Nov. 25, 1924.                                        1,517,184
           M. J. BARTO ET AL
               HOSE CLAMP
           Filed March 8, 1924
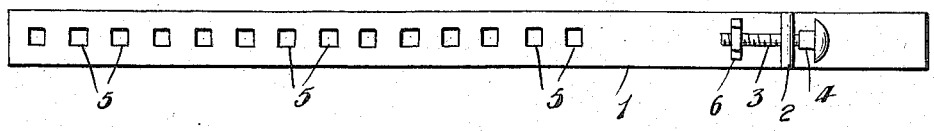
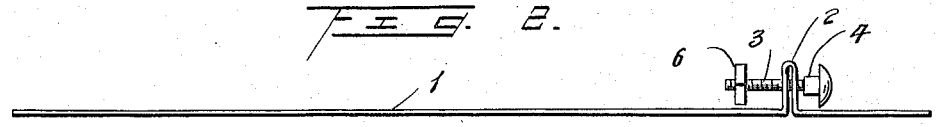
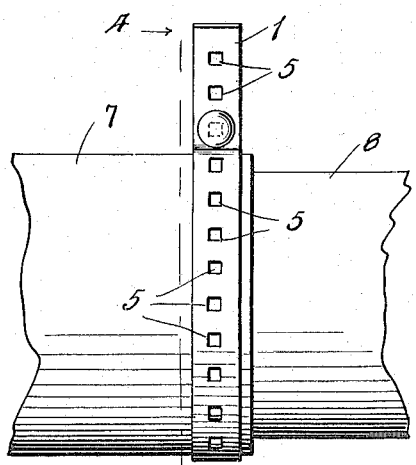
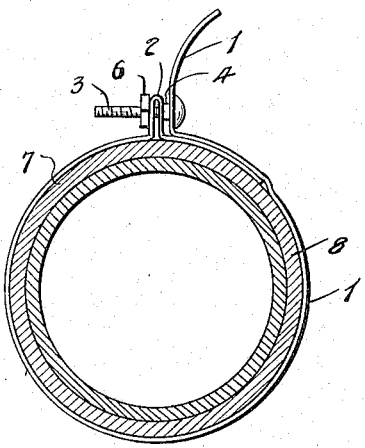
Inventor
M. J. Barto + J. A. Fiste.

Patented Nov. 25, 1924.

1,517,184

UNITED STATES PATENT OFFICE.

MICHAEL J. BARTO AND JESS A. FISTE, OF SEATONVILLE, ILLINOIS.

HOSE CLAMP.

Application filed March 8, 1924. Serial No. 697,811.

*To all whom it may concern:*

Be it known that we, MICHAEL J. BARTO and JESS A. FISTE, citizens of the United States, residing at Seatonville, in the county of Bureau and State of Illinois, have invented certain new and useful Improvements in Hose Clamps; and we do hereby declare the following to be a full, clear, and exact description of the invention, such as will enable others skilled in the art to which it appertains to make and use the same.

The invention provides a clamp for securing hose or flexible tubing and which is adjustable and adapted to be readily applied and disconnected when required so as to be used again as desired.

The invention provides a clamp which is simple, light, effective and easily manipulated and which may be used in connection with different sizes of hose.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a plan view of the clamp extended,

Figure 2 is an edge view thereof,

Figure 3 is a side view showing the clamp applied, and

Figure 4 is a sectional view on the line 4—4 of Figure 3.

Corresponding and like parts are referred to in the following description and designated in the several views of the drawings by like reference characters.

The clamp comprises a strip 1 of metal which may be of any length, width and thickness. A portion of the strip 1 is crimped adjacent an end thereof to form a loop 2 which is apertured to receive a bolt 3 of the type having a square portion 4 adjacent its head. A plurality of openings 5 are formed in the length of the strip 1 and correspond in size to the square portion 4 of the bolt 3 so as to snugly receive the same and prevent the bolt from turning when rotating the nut 6 thereon. An end portion of the strip extends beyond the loop 2 so as to underlap the opposite end portion of the strip when the clamp is applied, as shown most clearly in Figure 4.

The clamp is adapted for use in securing the hose couplings of internal combustion engines and for securing fittings to rubber hose or tubing and, by reason of the peculiar formation and the plurality of openings 5, the clamp is readily adjustable to different sizes of hose or tubing. In practice, after the hose or tube 7 has been slipped upon the part 8, it may be made secure by passing the strip about the same and adjusting the loose end having the openings 5 so as to come opposite the loop 2, after which the bolt 3 is passed through registering openings of the loop 2 and strip, after which the nut 6 is placed in position and tightened to draw the strip about the hose and securely clamp the same.

What is claimed is:

1. A hose clamp comprising a metal strip having a portion adjacent an end crimped to provide an offstanding loop in which is formed an opening, said strip having a plurality of square openings in its length, and a bolt having a square portion adjacent its end to engage one of the square openings of said strip and the opening of said loop, and a nut threaded upon the bolt and adapted to draw end portions of the strip together and tighten the clamp about the part to be made fast.

2. A hose clamp comprising a strip having an offstanding portion adjacent an end and provided in its length with a plurality of openings of non-circular outline, a bolt adapted to pass through an opening in the offstanding portion of the strip and having a part adjacent its head of non-circular outline to correspond with the outline of the openings formed in the length of the strip, and a nut threaded upon the bolt and adapted to coact therewith to tighten the clamp about the part to be secured.

In testimony whereof we affix our signatures in presence of two witnesses.

MICHAEL J. BARTO.
JESS A. FISTE.

Witnesses:
FRED MOUDEN,
THOMAS WONDERS.